(12) United States Patent
Harris

(10) Patent No.: US 8,154,140 B2
(45) Date of Patent: Apr. 10, 2012

(54) AIR REGENERATION FOR A MOVING VEHICLE

(75) Inventor: Scott C. Harris, Rancho Santa Fe, CA (US)

(73) Assignee: Harris Technology, LLC, Rancho Santa Fe, CA (US)

( * ) Notice: Subject to any disclaimer, the term of this patent is extended or adjusted under 35 U.S.C. 154(b) by 411 days.

(21) Appl. No.: 12/471,450

(22) Filed: May 25, 2009

(65) Prior Publication Data

US 2010/0295315 A1 Nov. 25, 2010

(51) Int. Cl.
*F03D 9/00* (2006.01)
(52) U.S. Cl. .......................................... 290/44; 290/55
(58) Field of Classification Search .......... 290/44, 290/55; 180/2.2, 165; 303/152
See application file for complete search history.

(56) References Cited

U.S. PATENT DOCUMENTS

| 4,632,205 | A | * | 12/1986 | Lewis | 180/165 |
| 5,287,004 | A | * | 2/1994 | Finley | 290/55 |
| 6,113,197 | A | | 9/2000 | Kuroki | |
| 7,168,770 | B2 | * | 1/2007 | Takeuchi | 303/152 |
| 2002/0163250 | A1 | * | 11/2002 | Huls et al. | 303/152 |
| 2004/0238248 | A1 | | 12/2004 | Fleming | |
| 2006/0237247 | A1 | | 10/2006 | Severinsky et al. | |
| 2008/0150290 | A1 | | 6/2008 | Fein et al. | |
| 2009/0025696 | A1 | | 1/2009 | Lovgren | |
| 2009/0108587 | A1 | | 4/2009 | Mitmesser | |

* cited by examiner

*Primary Examiner* — Nguyen N Hanh
(74) *Attorney, Agent, or Firm* — Law Office of Scott C. Harris, Inc.

(57) ABSTRACT

Airflow regeneration device, which generates electricity from air resistance, but only when the vehicle is in the speed reduction mode. In the non-speed reduction mode, the air resistance is minimally increased. In the speed reduction mode, the air resistance is intentionally increased.

17 Claims, 1 Drawing Sheet

AIR REGENERATION FOR A MOVING VEHICLE

BACKGROUND

Moving vehicles which move must overcome air resistance in order to move. Vehicle manufacturers often shape their vehicles in order to minimize the air resistance.

SUMMARY

The present application describes intentionally increasing air resistance at of a vehicle at certain times of operation of the vehicle, and using the force that is generated from the increased air resistance as regenerative power.

In embodiments the regenerative power can be used to charge a battery or move a flywheel in a vehicle.

DETAILED DESCRIPTION

An embodiment describes regeneration from air resistance in a moving vehicle. Throughout the embodiments, the embodiments describe operation in an automobile, however it should be understood that this air regeneration technique may be also usable in other vehicles including airplanes and boats, for example.

Figure 1:
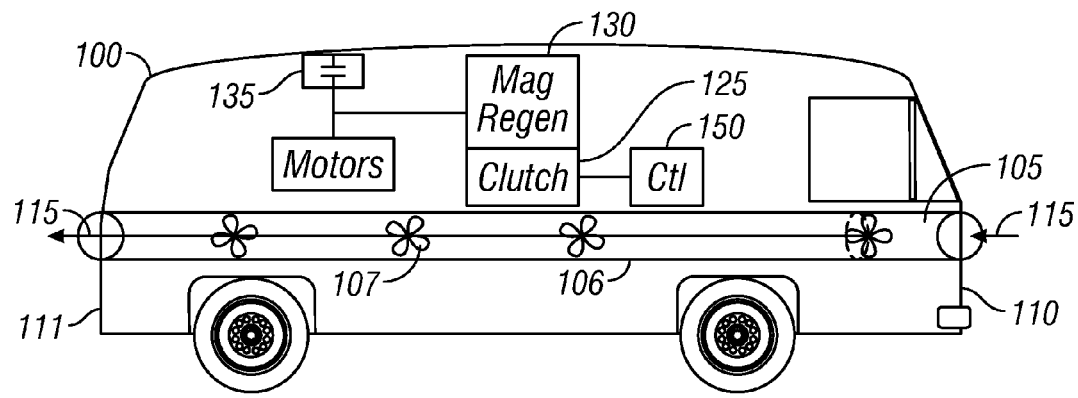
FIG. 1 shows a block diagram of a vehicle of a first embodiment where the air resistance through an internal conduit is selectively loaded and/or unloaded.

FIG. 1 illustrates an embodiment in which a moving vehicle 100 includes a chamber 105 therein. In the embodiment shown, the chamber extends all the way from the front 110 of the vehicle 100 to its rear 111. In other embodiments, the chamber can be in any other location, and can extend for example only over portions of the vehicle's area, for example, if desired. The chamber 105 includes an inner surface 106 with a number of turbines 107 therein. The figure shows four such turbines, however, there can be any number of such turbines.

The turbines are driven by airflow shown generally as 115 through the inside of the chamber 106. As the vehicle moves, the airflow passes along the path 115, and causes the turbines to spin.

In operation, the turbines either each individually, or collectively, include a clutch device 125 that selectively connects the turbine to an electrical regeneration system 130. The magnetic regeneration system, for example, may be a loop that spins within a magnetic field to generate electricity. The spinning creates electricity and uses that electricity to charge a battery bank 135. Stored power in the battery bank 135 may control one or more electric motors that provide electromotive force to the vehicle.

A controller 150 controls the charging and discharging of the battery bank 135, and may sense vehicle deceleration and/or braking. For example, the controller may detect either engine braking in the vehicle, and/or actual braking in the vehicle.

The sensing of deceleration or braking causes actuation of the clutch 125, e.g., an electronic clutch actuation. The clutch places the load of an electric generator on the spinning turbines.

Therefore, in operation, the turbines 107 usually spin freely, so that they cause a minimal if any drag against airflow. When spinning freely, there is some but very limited drag on the airflow, with the air passing through the conduit 115. Many such conduits can be provided through the vehicle, allowing air through the conduits. The air flowing through the conduit, without load on the turbines, may minimally, increase air resistance. It may even in some circumstances reduce the air drag by allowing air flow through the openings through the vehicle . However, during times of real braking and/or engine braking, loads are placed on the spinning turbines by attaching these turbines to electric generators. Not only does this increase the air resistance of the vehicle, assisting in the braking effect, but it also generates electricity.

In this way, the openings through the automobile can actually improve the air resistance, by leaving these openings unloaded. However, during times of braking, the air resistance can be increased.

These conduits can be located in any location of the vehicle. For example, in the FIG. 1 embodiment, the regenerative devices may also be located on the top of the vehicle, for an example.

Figure 2A:
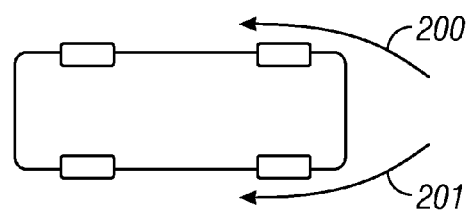
FIGS. 2A-2C show an embodiment with fold out flaps, which fold out to regenerate air pressure from wind resistance.
Figure 2B:
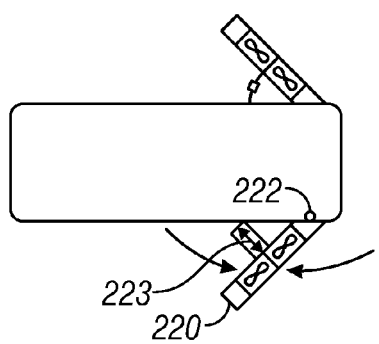
Figure 2C:
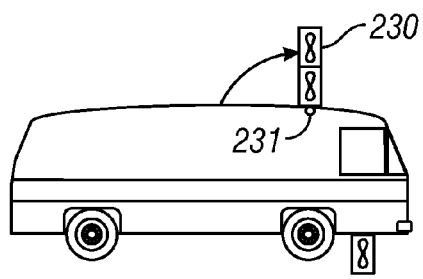

A second embodiment uses a moving part to avoid air resistance effect during normal operation, but increases the air resistance during braking. FIG. 2 shows for example the automobile from a top view. During normal operation, no parts are extended into the normal airflow, and air flows normally around the vehicle and parts as generally shown by the arrows 200, 201. However, during the time of braking, one or more flaps are extended from the vehicle to increase intentionally the air resistance. For example, the foldout flap 220 may fold out from its stowed location on the automobile, significantly increasing the air resistance of the vehicle.

The foldout flaps may include spinning turbines therein which regenerate energy created by the air resistance at the same time as its force contributes to the air resistance, in order to slow down the vehicle.

The foldout flap may be on sides of the vehicle, for example, or may be located on the roof of the vehicle. The roof mounted device pivots upward from its from its stowed position that is parallel with the roof line, during times of braking. Once folded up, the turbines may spin under force of the air resistance, to cause regenerative recovery of energy by increasing the air resistance and regenerating the power created by increasing the air resistance.

A similar operation can be carried out on the bottom of the automobile, where fold-down flaps can be located.

Each of the flaps may be driven by a motor such as 231 to fold them open.

In an alternative embodiment, the flaps can have a spring such as 222, that causes the flaps to spring out quickly. These fold out embodiments can also use fluidic shock absorbers such as 223 to avoid sudden movements of the flaps, and thumps or "bangs" caused by the device folding out.

After the vehicle has come to a complete stop, or when acceleration is again detected, a motor can pull the devices back into their stowed position where they do not effect air flow.

Although only a few embodiments have been disclosed in detail above, other embodiments are possible and the inventor intends these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other vehicles can use this system. Other devices besides turbines can be used for used for generating the energy.

Also, the inventor intends that only those claims which use the words "means for" are intended to be interpreted under 35 USC 112, sixth paragraph. Moreover, no limitations from the specification are intended to be read into any claims, unless those limitations are expressly included in the claims.

The controller described herein may be any kind of computer, either general purpose, or some specific purpose computer such as a workstation. The computer may be a special purpose computer such as a PDA, cellphone, or laptop.

The programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A method comprising:
   detecting braking in a vehicle;
   responsive to said detecting braking, increasing an air resistance of movement of said vehicle;
   said increasing an air resistance also creating electricity from said increasing air resistance; and
   reducing said air resistance after said braking is no longer detected, wherein said increasing air resistance comprises moving a moveable item to a position in a path of airflow in a way increases the air resistance and said reducing said air resistance comprises moving said moveable item to a second position out of a path of airflow in a way that reduces air resistance.

2. A method as claim 1, wherein said increasing air resistance further comprises placing a load on at least one rotating turbine that is rotating based on air resistance, and said reducing air resistance comprises removing said load from said at least one rotating turbine.

3. A method as in claim 2, wherein said reducing air resistance comprises said at least one turbine to spin unloaded to reduce air resistance, and connecting said at least one turbine to an electric generator which provides a load on said turbines, to increase said air resistance.

4. A method as in claim 3, wherein said connecting said turbines comprises using an electronically controlled clutch to connect between the at least one spinning turbine and an electric generator.

5. A method as in claim 1,
   wherein said increasing air resistance
   moves said movable item from a first position which does not significantly increase an air resistance of the vehicle, to a second position, which does increase the air resistance of the vehicle, by hinging said moveable item at a hinge point and moving an opposite end of said moveable item closer to said vehicle in said first position, and further from said vehicle in said second position.

6. A method as in claim 5, wherein said movable item is moved side to side relative to said vehicle.

7. A method as in claim 5, wherein said movable item is moved up and down relative to said vehicle.

8. A method as in claim 1, wherein said first position that increases air resistance is a first portion that is moved outwardly from the vehicle to interfere with the aerodynamic flow of the vehicle when extended.

9. A method as in claim 8, wherein said first portion includes turbines therein, which are driven by increased air resistance when said first portion is extended.

10. A system, comprising:
    a controller that determines when a vehicle is operating normally, and when the vehicle is reducing its speed;
    an electric generator;
    an airflow regenerating item, selectively placed in a location that recovers energy from air resistance when said vehicle is reducing its speed, where said airflow regenerating item does not recover energy from wind resistance and does not increase wind resistance when the vehicle is not reducing its speed, said wind regenerating item coupling energy from said air resistance to said electric generator when the vehicle is reducing its speed, to cause electricity generation when said vehicle is reducing its speed, wherein said airflow regenerating item moves between a first position which does not increase an air resistance of the vehicle, and a second position, which does increase the air resistance of the vehicle, and in said second position uses at least one turbine to recover energy from the air resistance.

11. A system as in claim 10 wherein said airflow regenerating item has at least one turbine that spins freely when the vehicle is not reducing its speed, and which are connected to said electric generator when the vehicle is reducing its speed.

12. A system as in claim 11, further comprising an electronic clutch which connects said turbine to said electric generator when said vehicle is reducing its speed, and releases said turbines from said generator when said vehicle is not reducing its speed.

13. A system as in claim 10, wherein said airflow regenerating item is moved from said first position which does not significantly increase an air resistance of the vehicle, to said second position, which does increase the air resistance of the vehicle, by hinging said airflow regenerating item at a hinge point and moving an opposite end of said airflow regenerating item closer to said vehicle in said first position, and further from said vehicle in said second position.

14. A system as in claim 13, wherein said airflow regenerating item is moved side to side relative to said vehicle.

15. A system as in claim 13, wherein said airflow regenerating item is moved up and down relative to said vehicle.

16. The vehicle system as in claim 10, wherein said airflow regenerating item is physically outside the vehicle, and is moved into a location which has increased air resistance when the vehicle is reducing its speed and is moved out of said location when the vehicle is not reducing its speed.

17. A system, comprising:
    a controller that determines when a vehicle is operating normally, and when the vehicle is reducing its speed;
    an electric generator;
    an airflow regenerating item, selectively placed in a location that recovers energy from air resistance when said vehicle is reducing its speed, where said airflow regenerating item does not recover energy from wind resistance and does not increase wind resistance when the vehicle is not reducing its speed, said wind regenerating item coupling energy from said air resistance to said electric generator when the vehicle is reducing its speed, to cause electricity generation when said vehicle is reducing its speed, wherein said airflow regenerating item is inside a conduit extending through the vehicle that is the same size at both ends to reduce air drag on the vehicle by air flowing though said conduit.

* * * * *